(12) United States Patent
Okada et al.

(10) Patent No.: US 10,047,895 B2
(45) Date of Patent: Aug. 14, 2018

(54) JOINT COVER

(71) Applicant: Nitta Corporation, Osaka-shi (JP)

(72) Inventors: Masatsugu Okada, Nabari (JP); Satoru Hosotani, Nabari (JP)

(73) Assignee: Nitta Corporation, Osaka-shi (JP)

(*) Notice: Subject to any disclaimer, the term of this patent is extended or adjusted under 35 U.S.C. 154(b) by 0 days.

(21) Appl. No.: 15/106,376

(22) PCT Filed: Dec. 18, 2014

(86) PCT No.: PCT/JP2014/083531
§ 371 (c)(1),
(2) Date: Jun. 20, 2016

(87) PCT Pub. No.: WO2015/098684
PCT Pub. Date: Jul. 2, 2015

(65) Prior Publication Data
US 2017/0030507 A1  Feb. 2, 2017

(30) Foreign Application Priority Data

Dec. 25, 2013 (JP) .................. 2013-267599

(51) Int. Cl.
*F16L 21/00* (2006.01)
*F16L 57/00* (2006.01)
(Continued)

(52) U.S. Cl.
CPC ........ *F16L 57/005* (2013.01); *B01D 53/9409* (2013.01); *F01N 3/28* (2013.01);
(Continued)

(58) Field of Classification Search
CPC .................................................. F16L 3/1025
(Continued)

(56) References Cited

U.S. PATENT DOCUMENTS 5,379,836 A * 1/1995 Jordan ............... E21B 17/1035
166/241.6
6,595,473 B2 * 7/2003 Aoki ....................... F16L 3/10
138/108
(Continued)

FOREIGN PATENT DOCUMENTS

CN 202167800 U 3/2012
JP 2001-200983 A 7/2001
(Continued)

OTHER PUBLICATIONS

International Search Report dated Mar. 24, 2015, issued for PCT/JP2014/083531.
(Continued)

*Primary Examiner* — Aaron M Dunwoody
(74) *Attorney, Agent, or Firm* — Locke Lord LLP

(57) ABSTRACT

The present invention provides a joint cover capable of improving working efficiency in mounting a joint cover on a joint. A joint cover provided on the outside of a joint includes a first cover body provided with an opening and adapted to house one side of the joint; and a second cover body detachably attachable to the first cover body, wherein a dividing position formed when the first cover body and the second cover body are in contact with each other is offset toward the second cover body.

8 Claims, 23 Drawing Sheets

(51) Int. Cl.
*B01D 53/94* (2006.01)
*F01N 3/28* (2006.01)

(52) U.S. Cl.
CPC ...... *F01N 2610/02* (2013.01); *F01N 2610/14* (2013.01); *F01N 2610/1413* (2013.01)

(58) Field of Classification Search
USPC ........... 285/419; 174/70 C, 88 S, 84 S, 74 A, 174/72 A, 135
See application file for complete search history.

(56) References Cited

U.S. PATENT DOCUMENTS

| | | | | |
|---|---|---|---|---|
| 6,968,864 | B2* | 11/2005 | Miyamoto | B60R 16/0215 138/108 |
| 7,007,900 | B2* | 3/2006 | Goodwin | H02G 7/053 248/68.1 |
| 7,581,564 | B2* | 9/2009 | Tanaka | F16L 21/06 138/110 |
| 7,692,095 | B2* | 4/2010 | Katsumata | H02G 3/0691 174/72 A |
| 8,262,308 | B2* | 9/2012 | Peng | F16B 5/0635 285/39 |
| 8,526,801 | B2 | 9/2013 | Borgmeier et al. | |
| 8,847,073 | B2* | 9/2014 | Tokunaga | B60R 16/0215 174/68.1 |
| 8,944,474 | B2* | 2/2015 | Serizawa | F16L 3/1091 285/373 |
| 2002/0079697 | A1* | 6/2002 | Griffioen | F16L 41/023 285/123.1 |
| 2004/0183305 | A1* | 9/2004 | Fisher | A61M 39/1011 285/419 |
| 2005/0029005 | A1* | 2/2005 | Arai | H02G 3/30 174/72 A |
| 2010/0263740 | A1 | 10/2010 | Borgmeier et al. | |
| 2010/0290764 | A1 | 11/2010 | Borgmeier et al. | |
| 2012/0298404 | A1* | 11/2012 | Tokunaga | B60R 16/0215 174/135 |

FOREIGN PATENT DOCUMENTS

| | | |
|---|---|---|
| JP | 2007-078064 A | 3/2007 |
| JP | 2009-168119 A | 7/2009 |
| JP | 2009-168120 A | 7/2009 |
| JP | 2009-264402 A | 11/2009 |
| JP | 2010-065735 A | 3/2010 |
| JP | 2010-071270 A | 4/2010 |
| JP | 2010-133516 A | 6/2010 |
| JP | 2011-506889 A | 3/2011 |
| JP | 2013-108533 A | 6/2013 |
| JP | 2014-009755 A | 1/2014 |

OTHER PUBLICATIONS

First Office Action dated Apr. 6, 2017, by the Chinese Patent Office, in corresponding Chinese Patent Application No. 201480067420.X.

* cited by examiner

JOINT COVER

TECHNICAL FIELD

The present invention relates to a joint cover, and more particularly, to a joint cover provided over a joint used for urea water supply piping.

BACKGROUND ART

Urea water supply piping is used for an exhaust purification system adapted to purify nitrogen oxides (hereinafter referred to as "NOx") in internal combustion engines such as diesel engines. Such an exhaust purification system is disclosed, for example, in Patent Literature 1, where the disclosed exhaust purification system includes a catalyst provided in an exhaust passage of an internal combustion engine and a urea water addition valve provided on an upstream side of the catalyst. Urea water is stored in a tank, force-fed to a urea water addition valve by a pump through a urea water supply pipe, and added into the exhaust passage through the urea water addition valve. Consequently, the urea water is broken down into ammonia, and NOx in exhaust is selectively reduced on the catalyst by the ammonia, thereby purifying the exhaust.

Urea water freezes at around −11° C., presenting a problem in that the urea water can freeze in urea water supply piping depending on the use environment, which may make it impossible to supply the urea water to the exhaust passage.

To deal with this, a joint connected to a urea water supply pipe and provided with a heating wire for use to heat urea water is disclosed (e.g. Patent Literature 2). Also, the joint is provided with a joint cover for protection against the wind. The joint cover is made up of two housings shaped to be symmetrical to each other and the housings are mounted on the joint by attaching the joint to a first of the housings and then fixing a second of the housings to the first of the housings in such a way as to cover the joint from above.

CITATION LIST

Patent Literature

Patent Literature 1: Japanese Patent Laid-Open No. 2010-71270
Patent Literature 2: U.S. Pat. No. 8,526,801

SUMMARY OF INVENTION

Technical Problem

In the case of Patent Literature 2, since the housings are shaped to be symmetrical to each other, the first housing covers only half an outer circumference of the joint and consequently, when the joint is attached to the first housing, the joint is not stable. This poses a problem of poor working efficiency in mounting the joint cover on the joint. Also, there is a problem in that in fixing the second housing to the first housing and covering the joint with the joint cover, the heating wire tends to be pinched between the housings.

Thus, an object of the present invention is to provide a joint cover capable of improving working efficiency in mounting a joint cover on a joint.

Solution to Problem

The present invention provides a joint cover provided on the outside of a joint, the joint cover comprising: a first cover body provided with an opening and adapted to house one side of the joint; and a second cover body detachably attachable to the first cover body, wherein a dividing position formed when the first cover body and the second cover body are in contact with each other is offset toward the second cover body.

Advantageous Effects of Invention

According to the present invention, since the dividing position is formed at a position offset toward the second cover body, the first cover body can house more than half an outer circumference of the joint. Consequently, in attaching the first cover body to the joint, the first cover body can hold the joint more stably, making it possible to improve working efficiency in mounting the joint cover to the joint.

DESCRIPTION OF EMBODIMENTS

Figure 1:
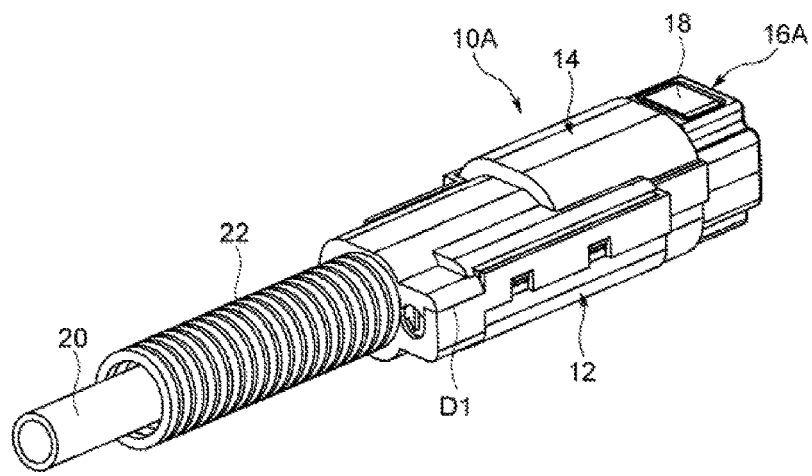
FIG. 1 is a perspective view showing how a joint cover according to a first embodiment is used.

Embodiments of the present invention will be described in detail below with reference to the drawings. The terms "top" (or up or upper) and "bottom" (or down or lower) used herein indicate "top" and "bottom" in the drawings, respectively, and are used simply for convenience of explanation, and, needless to say, the top and bottom may actually be reversed or positioned on the left and right.

1. First Embodiment (1) Overall Configuration

A joint cover 10A shown in FIG. 1 includes a first cover body 12 and a second cover body 14 and is provided on the outside of a joint 16A. The joint 16A is connected with a urea water supply pipe 20, which is a tubular body. The urea water supply pipe 20 is inserted in a corrugated tube 22 serving as a protective tube.

Figure 2:
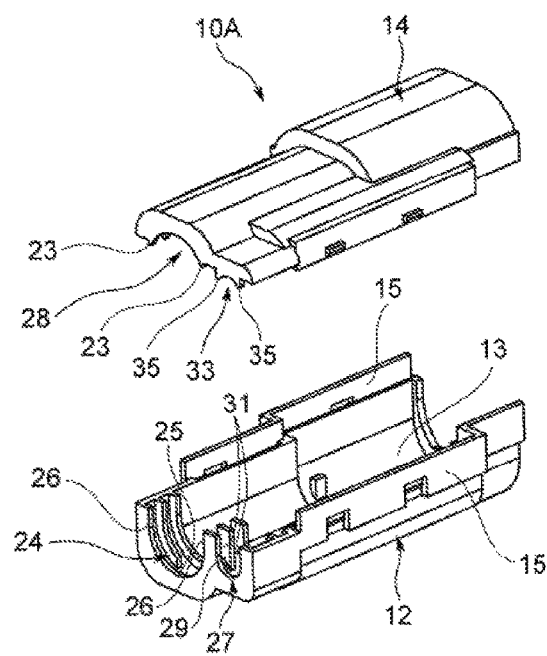
FIG. 2 is an exploded perspective view showing an overall configuration of the joint cover according to the first embodiment.

As shown in FIG. 2, the joint cover 10A is formed by the first cover body 12 and the second cover body 14 so as to be divisible in two in an up-and-down direction. A dividing position D1 between the first cover body 12 and the second cover body 14 is formed at a position offset toward the second cover body 14 from a center of an outer circumference of the joint 16A. That is, the first cover body 12 takes up more than half, e.g. two-thirds of the outer circumference of the joint cover 10A. The second cover body 14 is configured to take up less than half, e.g. one-third of the outer circumference of the joint cover 10A. Although not particularly limited, the joint cover 10A is made of synthetic resin, and preferably made, for example, of polyamide (including aromatic polyamide), polybutylene terephthalate, polyethylene terephthalate, polyethylene, polyvinyl chloride, ABS, polypropylene, polyacetal, polyether ketone, fluoroplastics, or the like.

In FIG. 2, the first cover body 12 is a container-shaped member which has an opening in upper part and includes a substantially rectangular base 13 and side faces 15 formed integrally on the sides of the base 13. The first cover body 12 is formed such that length from the base 13 to an upper end of the side face 15 is longer than a radius of an outside diameter of the joint 16A. That is, the side faces 15 are formed high enough to cover lateral parts of the joint 16A attached to the first cover body 12.

A first holding portion 24 adapted to hold the corrugated tube 22 is provided on one end of the first cover body 12. The first holding portion 24 includes plural lamellar members and has a curved concave bottom 25 and walls 26 formed on opposite ends of the bottom 25. The wall 26 is formed such that length from the bottom 25 to an upper end is longer than a radius of an outside diameter of the corrugated tube 22. Thereby, with the use of the bottom 25 and the walls 26, the first holding portion 24 is able to hold lower part and lateral parts of the corrugated tube 22.

The first cover body 12 is provided with a first housing portion 27, which houses heating wires (not illustrated) and is located adjacent to the first holding portion 24. The first housing portion 27 includes a curved concave bottom 29 and housing walls 31 formed on opposite ends of the bottom 29. The plural heating wires, being tied in a bundle, are housed in the first housing portion 27. The housing wall 31 is formed such that length from the bottom 29 to an upper end of the housing wall 31 is longer than an overall outside diameter of the bundled heating wires.

The second cover body 14 is a lid-shaped member configured to be able to cover the opening of the first cover body 12. A second holding portion 28 adapted to hold an upper part of the corrugated tube 22 is provided on one end of the second cover body 14. The second holding portion 28 includes plural lamellar members and is formed into a curved concave shape, and provided with convex portions 23 formed on opposite ends. The convex portion 23 has a shape protruding toward the first cover body 12.

The second cover body 14 is provided with a second housing portion 33, which is located adjacent to the second holding portion 28 and adapted to cover an opening of the first housing portion 27. The second housing portion 33 is formed into a curved concave shape and provided with convex portions 35 formed on opposite ends.

Figure 3:
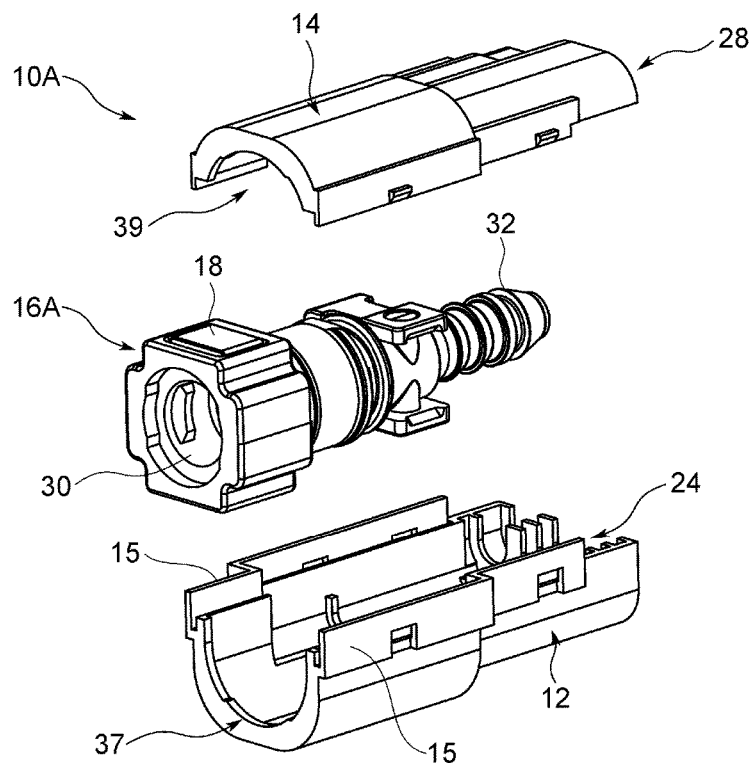
FIG. 3 is an exploded perspective view seen from the side opposite to FIG. 2, showing an overall configuration of the joint cover according to the first embodiment.

As shown in FIG. 3, a first outer circumference holding portion 37 is provided on another end of the first cover body 12. The first outer circumference holding portion 37 is formed into a curved concave shape, integrally with the side faces 15. A second outer circumference holding portion 39 is provided on another end of the second cover body 14. The second outer circumference holding portion 39 is formed into a curved concave shape. The second cover body 14 is formed in such a way that an operating portion (described later) provided on the joint 16A can be exposed.

As shown in FIG. 3, the joint 16A includes a first terminal portion 30 serving as a terminal portion, and a second terminal portion 32 formed coaxially with the first terminal portion 30. The first terminal portion 30 is provided with an operating portion 18. The operating portion 18 is configured to be able to operate a clamping mechanism allowing a pipe (not illustrated) that is a tubular body inserted in the first terminal portion 30, to be connected to or disconnected from the joint 16A. The urea water supply pipe 20 is to be connected with the second terminal portion 32.

Figure 4:
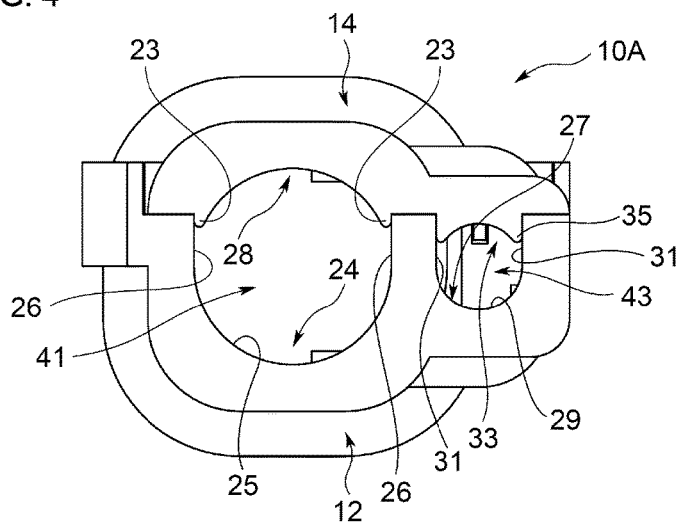
FIG. 4 is an end view of the joint cover according to the first embodiment.

In the joint cover 10A, as shown in FIG. 4, the second cover body 14 is placed to cover the opening of the first cover body 12 and is fixed to the first cover body 12, thereby forming a holding portion 41 and a housing portion 43. That is, the holding portion 41 is formed of the first holding portion 24 and the second holding portion 28. The convex portions 23 of the second holding portion 28 are disposed within the walls 26 of the first holding portion 24. The housing portion 43 is formed of the first housing portion 27 and the second housing portion 33. Although not illustrated, the first outer circumference holding portion 37 and the second outer circumference holding portion 39 make up an outer circumference holding portion.

Figure 5:
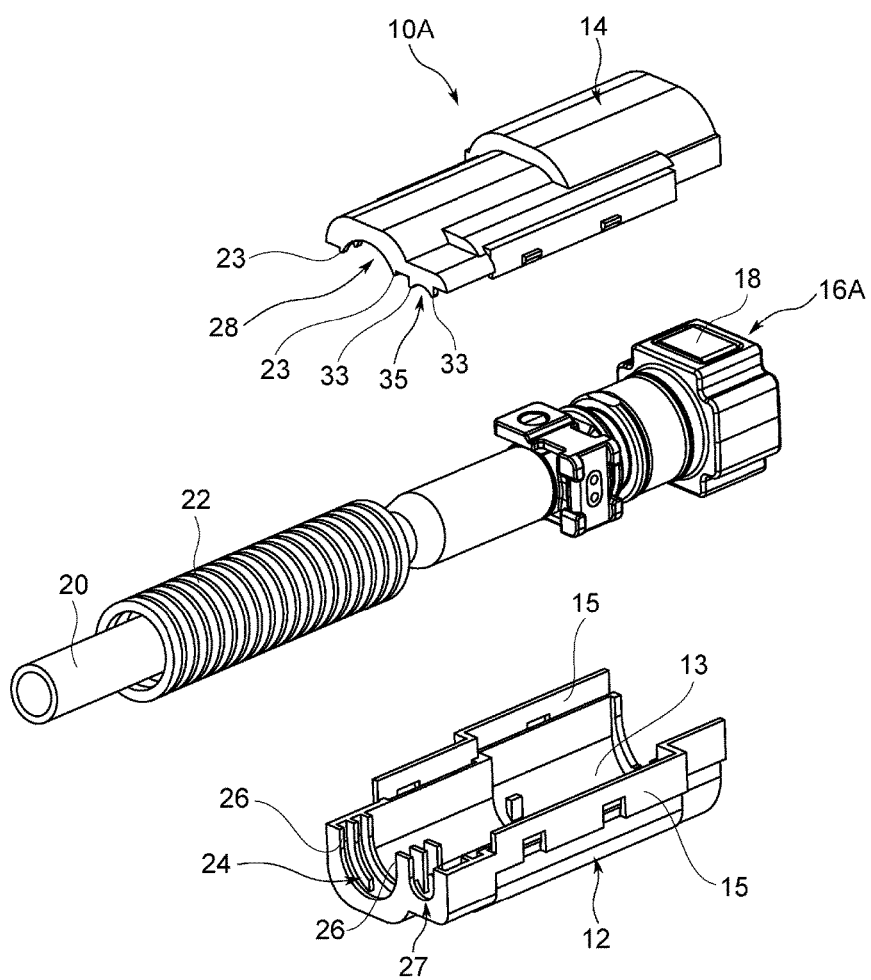
FIG. 5 is a perspective view showing how the joint cover according to the first embodiment is mounted on the joint.

A method for attaching the joint cover 10A with the above configuration will be described. First, as shown in FIG. 5, the first cover body 12 is attached to the joint 16A connected with the urea water supply pipe 20. The first holding portion 24 is inserted into grooves formed on an outer circumference of the corrugated tube 22 and thereby holds the lower part and the lateral parts of the corrugated tube 22. In so doing, since the side faces 15 of the first cover body 12 are formed high enough to cover the lateral parts of the joint 16A, the first cover body 12 is able to hold the joint 16A more stably. Although not illustrated, the heating wires are housed in the first housing portion 27 and led out of the first cover body 12.

Next, the second cover body 14 is fixed to the first cover body 12 to cover the opening of the first cover body 12 and the joint 16A, and thus the joint 16A is covered with the joint cover 10A (FIG. 1). The second holding portion 28 is inserted into the grooves formed on the outer circumference of the corrugated tube 22 and thereby holds the upper part of the corrugated tube 22. Consequently, the corrugated tube 22 is held by the holding portion 41. The heating wire is led out of the joint cover 10A through the housing portion 43. A first terminal portion 30 side of the joint 16A is held by the outer circumference holding portion. According to the present embodiment, the first terminal portion 30 of the joint 16A is exposed without being covered with the joint cover 10A. Detail views of the joint cover 10A according to the present embodiment are shown in FIG. 10 to FIG. 17.

(2) Operation and Effects

As described above, being configured such that the side faces 15 are high enough to cover the lateral parts of the joint 16A, the first cover body 12 is capable of housing more than half the outer circumference of the joint 16A. Consequently, when being attached to the joint 16A, the first cover body 12 is able to hold the joint 16A more stably. Thus, the joint cover 10A is able to improve working efficiency in attaching the joint cover 10A to the joint 16A.

The convex portions 23 are disposed within the walls 26 of the first holding portion 24, so that the second holding portion 28 is able to hold the upper part of the corrugated tube 22 more reliably. Thus, by simply fixing the second cover body 14 to the first cover body 12, the joint cover 10A is able to hold the corrugated tube 22 more reliably, and thereby improves the working efficiency in attaching the joint cover 10A to the joint 16A.

Since the housing walls 31 are formed such that the length from the bottom 29 to the upper end of the housing wall 31 is longer than the outside diameter of the heating wire, the heating wires are housed more reliably. Thus, the joint cover 10A avoids pinching the heating wires when being attached to the joint 16A and thereby further improves working efficiency.

Since the dividing position between the first cover body 12 and the second cover body 14 is offset toward the second cover body 14 from the center, the first cover body 12 and the second cover body 14 are shaped to be asymmetrical to each other. Thus, in attaching the joint cover 10A to the joint 16A, the joint cover 10A is able to prevent mixing up of the first cover body 12 and the second cover body 14, and thereby a sequence of operation is unified and working efficiency is further improved.

Since the joint cover 10A is formed so as to expose the operating portion 18 provided on the first terminal portion 30, the operating portion 18 can be operated and pipes can be connected to and disconnected from the first terminal portion 30, with the joint cover 10A remaining attached to the joint 16A. Thus, the joint cover 10A improves working efficiency in connecting pipes.

(3) Modification

Figure 6:
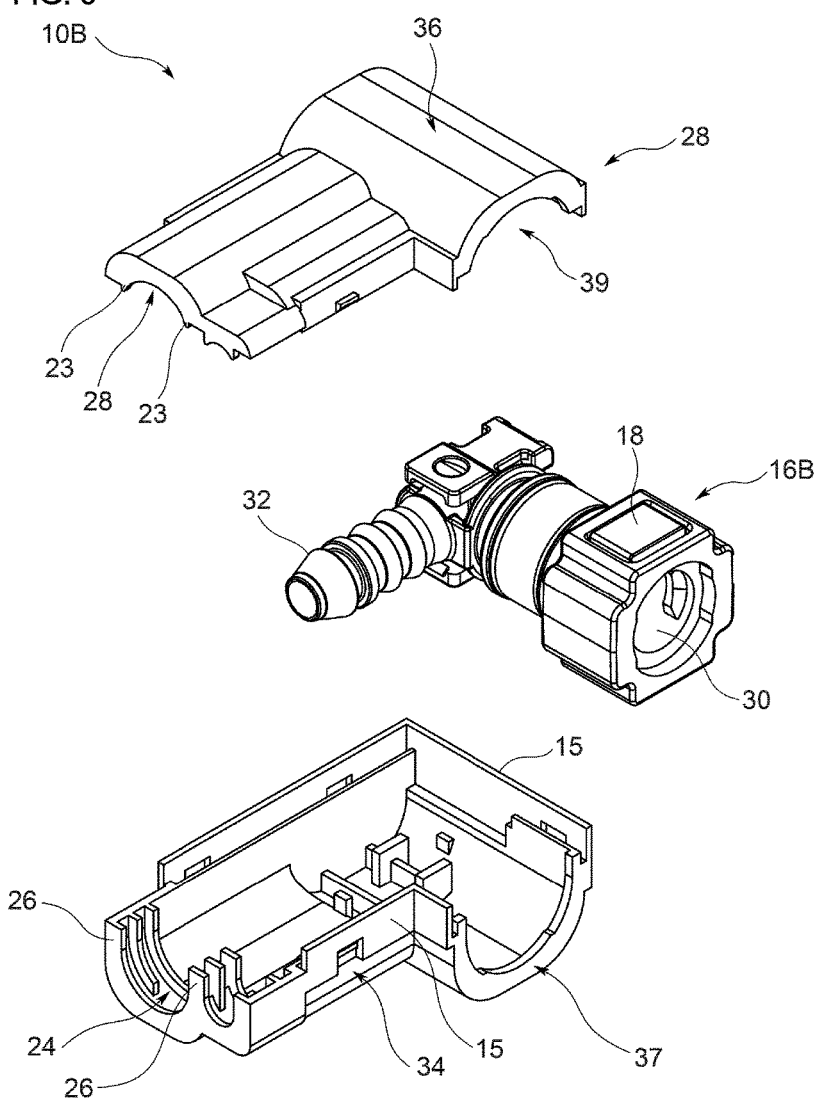
FIG. 6 is an exploded perspective view showing a configuration of a joint cover according to a modification of the first embodiment.

Whereas the joint cover 10A according to the first embodiment described above is used for the joint 16A in which the first terminal portion 30 and the second terminal portion 32 are provided coaxially, the present invention is not limited to this. For example, as shown in FIG. 6, the joint cover 10A may be used for a so-called elbow joint 16B in which a center axis of the first terminal portion 30 and a center axis of the second terminal portion 32 are placed at right angles to each other. In this case, to fit the shape of the joint 16B, each of a first cover body 34 and a second cover body 36 of the joint cover 10B is formed into an elbow shape. Detail views of the joint cover 10B according to the present modification are shown in FIG. 18 to FIG. 25.

2. Second Embodiment (1) Overall Configuration

Next, a joint cover 10C according to a second embodiment of the present invention will be described. The joint cover 10C according to the present embodiment differs from the first embodiment described above in the configuration of an outer circumference holding portion. Components similar to those in the first embodiment described above are denoted by reference numerals similar to the corresponding components, and description thereof will be omitted.

Figure 7:
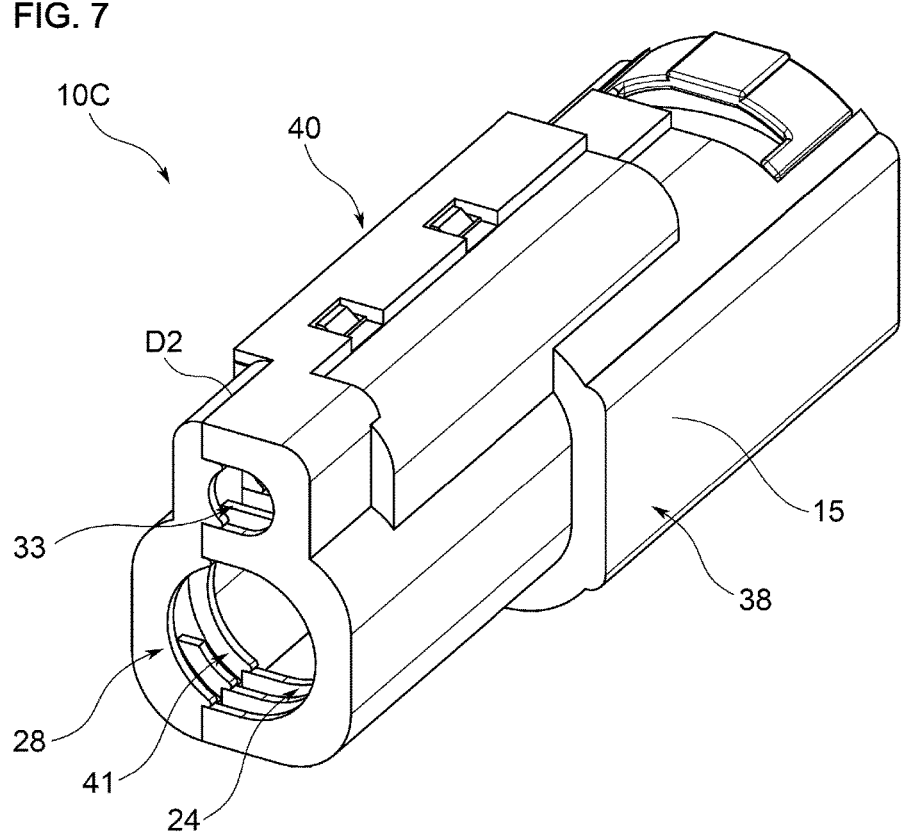
FIG. 7 is a perspective view showing a configuration of a joint cover according to a second embodiment.

A joint cover 10C shown in FIG. 7 includes a first cover body 38 and a second cover body 40. The joint cover 10C is formed of the first cover body 38 and the second cover body 40 so as to be divisible in two in the left-and-right direction in FIG. 7. A dividing position D2 between the first cover body 38 and the second cover body 40 is formed at a position offset toward the second cover body 40.

Figure 8:
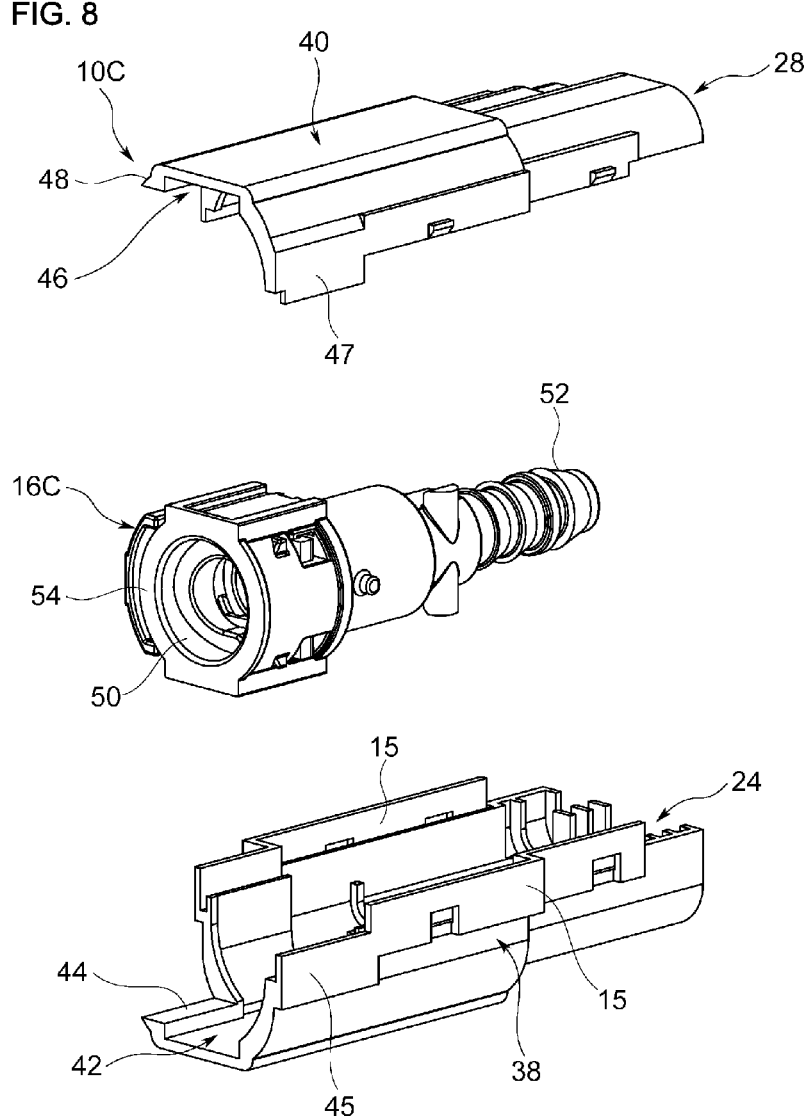
FIG. 8 is an exploded perspective view showing the configuration of the joint cover according to the second embodiment.

As shown in FIG. 8, a first outer circumference holding portion 42 provided on the first cover body 38 has a first outer circumferential wall 45 formed on one side with respect to a center axis. The first outer circumferential wall 45 has a height approximately equal in length to a radius of an outside diameter of a first terminal portion 50 and is formed integrally with the side face 15. A first notch 44 with the side face 15 removed is formed on the other side of the first outer circumference holding portion 42 with respect to the center axis.

A second outer circumference holding portion 46 provided on the second cover body 40 has a second outer circumferential wall 47 formed on one side with respect to the center axis. The second outer circumferential wall 47 has a height approximately equal in length to the radius of the outside diameter of the first terminal portion 50. A second notch 48 is formed on the other side of the second outer circumference holding portion 46 with respect to the center axis.

As shown in FIG. 8, a joint 16C includes the first terminal portion 50, and a second terminal portion 52 formed coaxially with the first terminal portion 50. An operating portion 54 is provided on the other side of the first terminal portion 50 with respect to the center axis. Detail views of the joint cover 10C according to the present embodiment are shown in FIG. 26 to FIG. 33.

In the joint cover 10C configured as described above, the second cover body 40 is placed to cover an opening of the first cover body 38 and the second cover body 40 is fixed to the first cover body 38, thereby forming the outer circumference holding portion. That is, the outer circumference holding portion is formed by the first outer circumference holding portion 42 and the second outer circumference holding portion 46. The first outer circumferential wall 45 and the second outer circumferential wall 47 of the outer circumference holding portion covers one side of the first terminal portion 50 with respect to the center axis. A dividing position on the one side of the joint cover 10C is formed at a position corresponding to an approximate center of an outer circumference of the joint 16C. On the other side of the outer circumference holding portion, an access window is formed by the first notch 44 and the second notch 48. The operating portion 54 of the joint 16C is exposed through the access window.

(2) Operation and Effects

Since the side faces 15 of the first cover body 38 are formed high enough to cover lateral parts of the joint 16C, the joint cover 10C according to the present embodiment achieves effects similar to those of the first embodiment described above.

According to the present embodiment, since each of the first outer circumferential wall 45 and the second outer circumferential wall 47 is formed approximately equal in length to the radius of the outside diameter of the first terminal portion 50, the dividing position on the one side of the joint cover 10C is formed at a position corresponding to an approximate center of the outer circumference of the joint 16C. Thus, the part of the joint cover 10C which covers the first terminal portion 50 can be downsized.

(3) Modification

Figure 9:
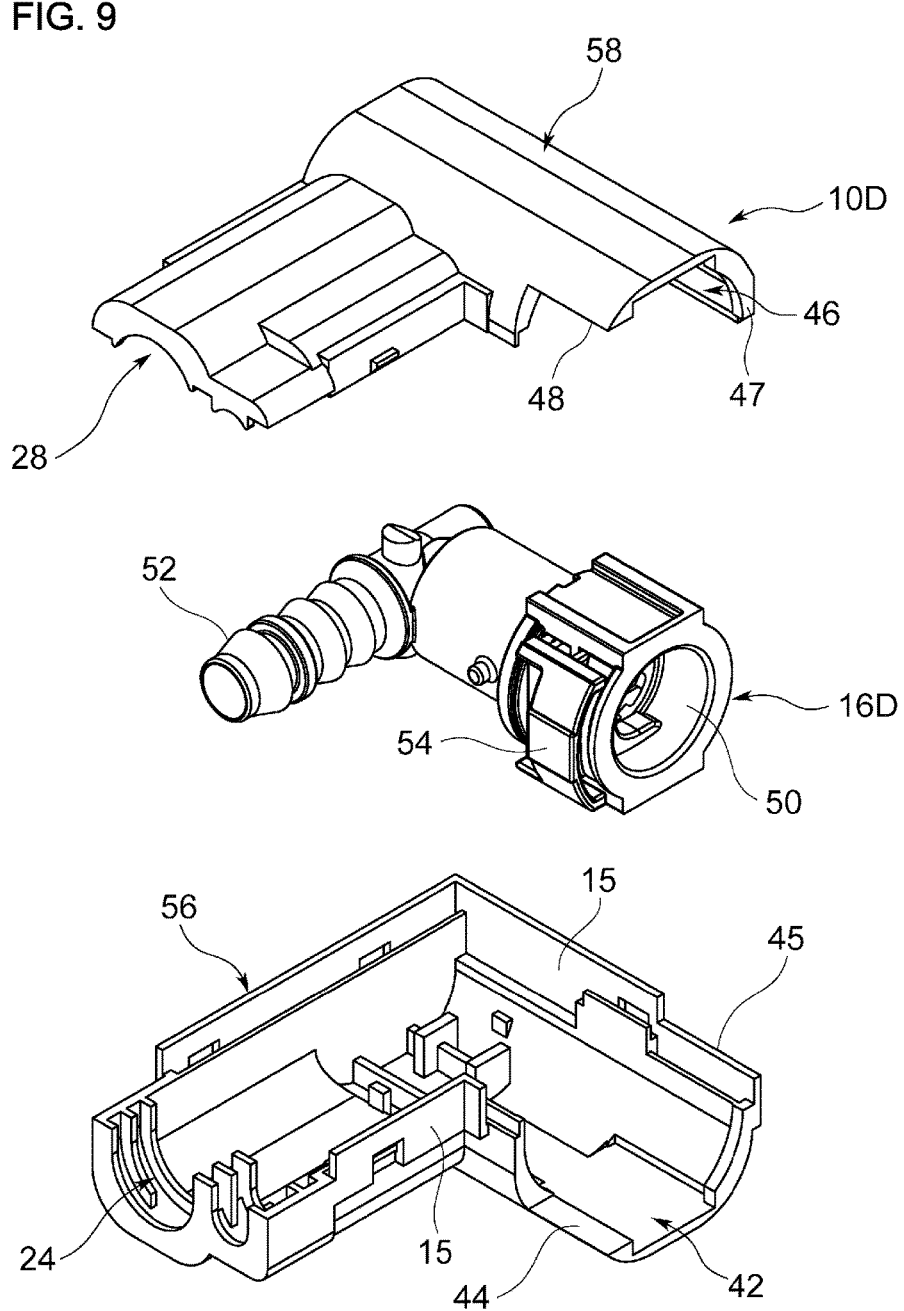
FIG. 9 is an exploded perspective view showing a configuration of a joint cover according to a modification of the second embodiment.
Figure 10:
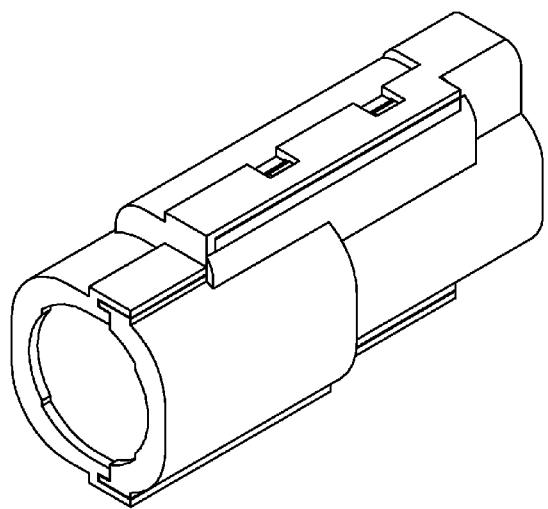
FIG. 10 is a perspective view showing the configuration of the joint cover according to the first embodiment.
Figure 11:
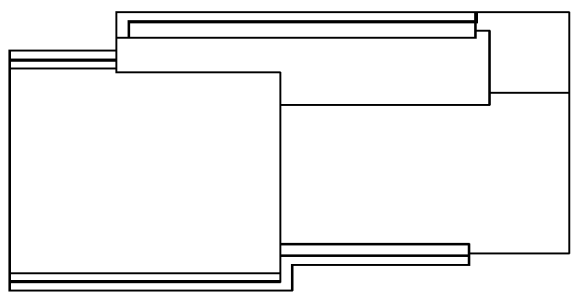
FIG. 11 is a front view showing the configuration of the joint cover according to the first embodiment.
Figure 12:
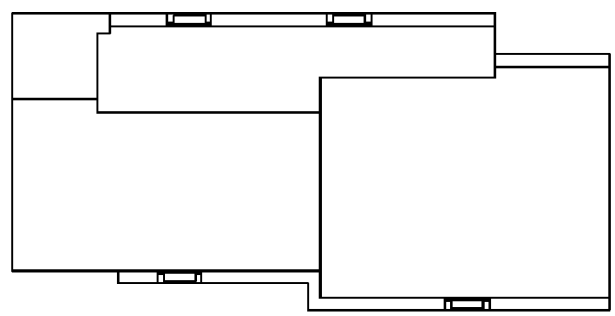
FIG. 12 is a rear view showing the configuration of the joint cover according to the first embodiment.
Figure 13:
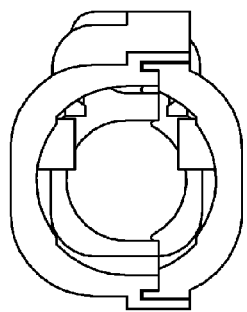
FIG. 13 is a left side view showing the configuration of the joint cover according to the first embodiment.
Figure 14:
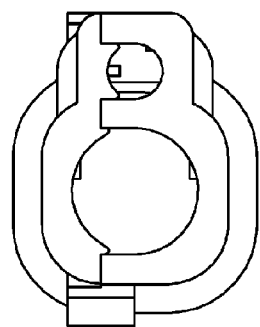
FIG. 14 is a right side view showing the configuration of the joint cover according to the first embodiment.
Figure 15:
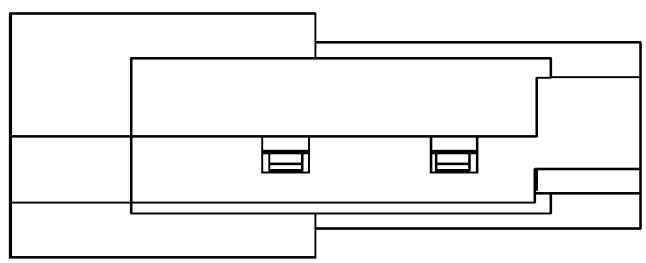
FIG. 15 is a plan view showing the configuration of the joint cover according to the first embodiment.
Figure 16:
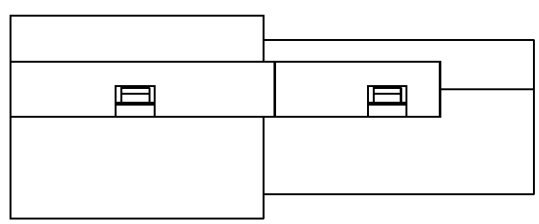
FIG. 16 is a bottom view showing the configuration of the joint cover according to the first embodiment.
Figure 17:
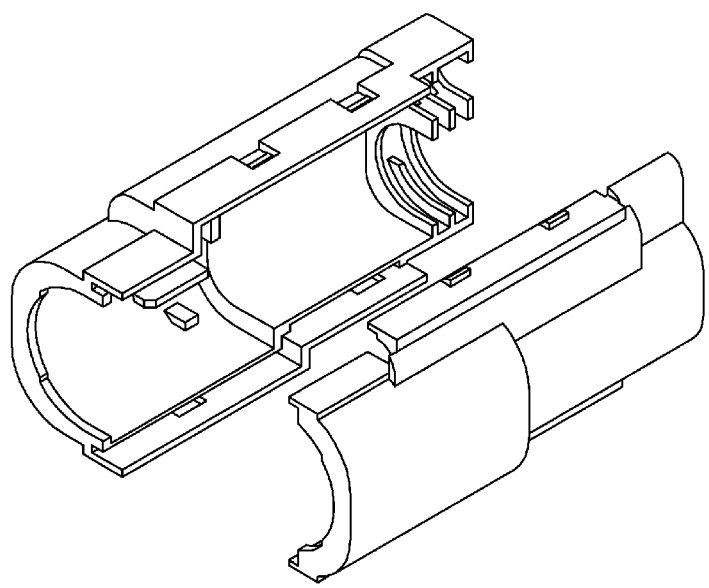
FIG. 17 is an exploded perspective view showing the configuration of the joint cover according to the first embodiment.
Figure 18:
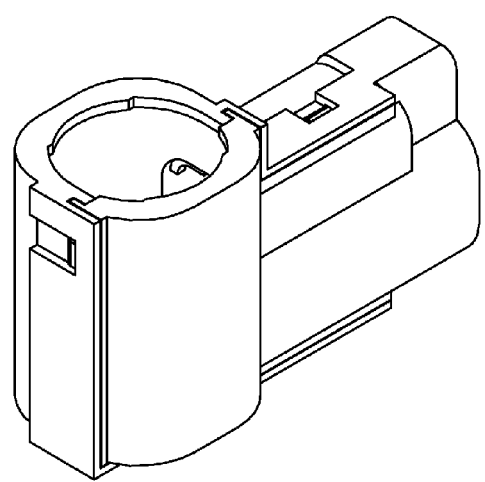
FIG. 18 is a perspective view showing a configuration of the joint cover according to the modification of the first embodiment.
Figure 19:
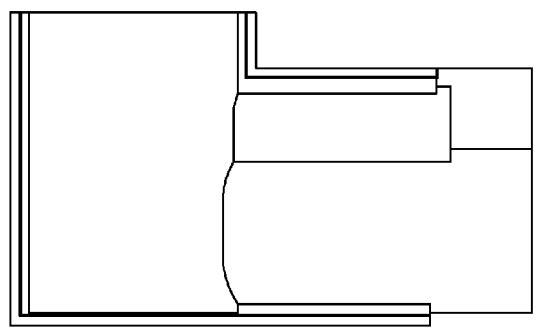
FIG. 19 is a front view showing the configuration of the joint cover according to the modification of the first embodiment.
Figure 20:
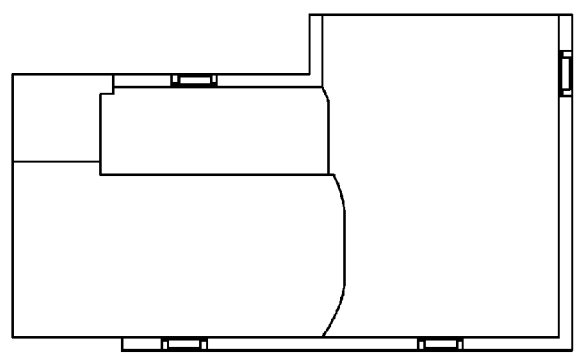
FIG. 20 is a rear view showing the configuration of the joint cover according to the modification of the first embodiment.
Figure 21:
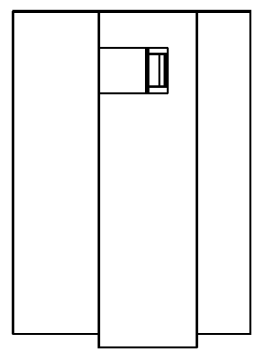
FIG. 21 is a left side view showing the configuration of the joint cover according to the modification of the first embodiment.
Figure 22:
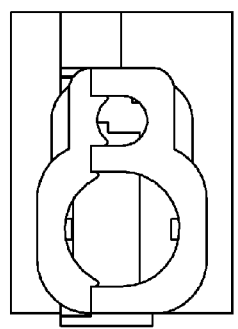
FIG. 22 is a right side view showing the configuration of the joint cover according to the modification of the first embodiment.
Figure 23:
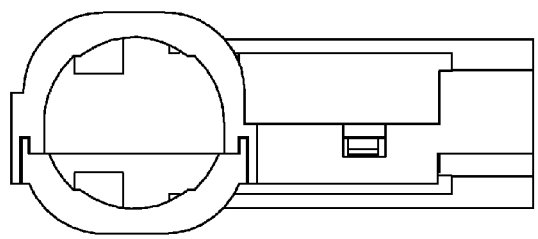
FIG. 23 is a plan view showing the configuration of the joint cover according to the modification of the first embodiment.
Figure 24:
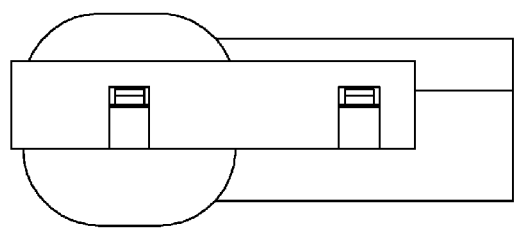
FIG. 24 is a bottom view showing the configuration of the joint cover according to the modification of the first embodiment.
Figure 25:
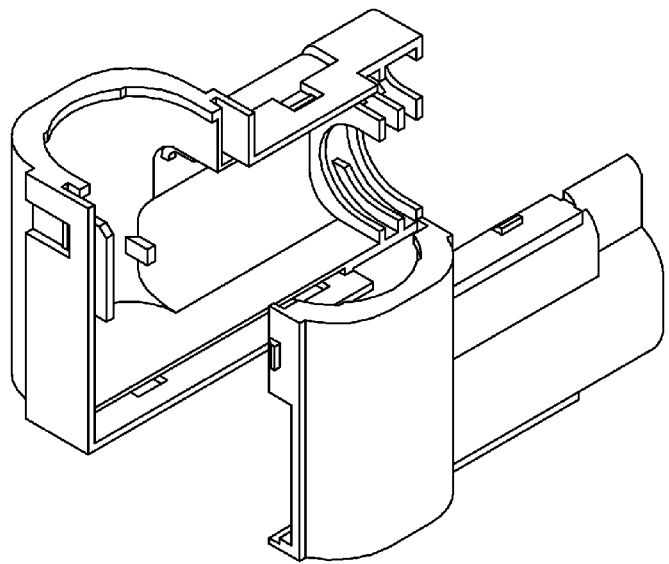
FIG. 25 is an exploded perspective view showing the configuration of the joint cover according to the modification of the first embodiment.
Figure 26:
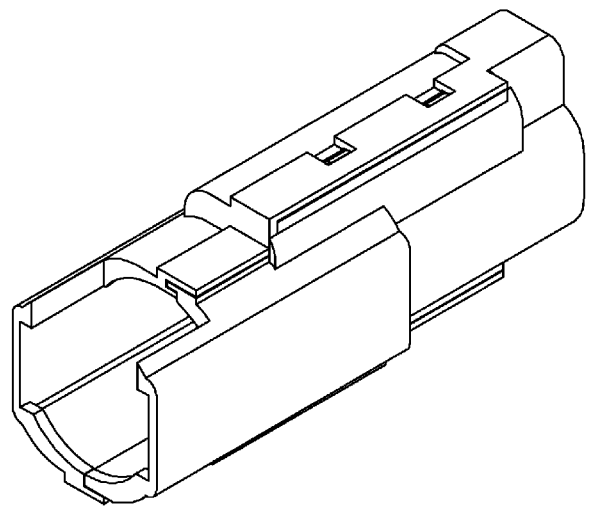
FIG. 26 is a perspective view showing the configuration of the joint cover according to the second embodiment.
Figure 27:
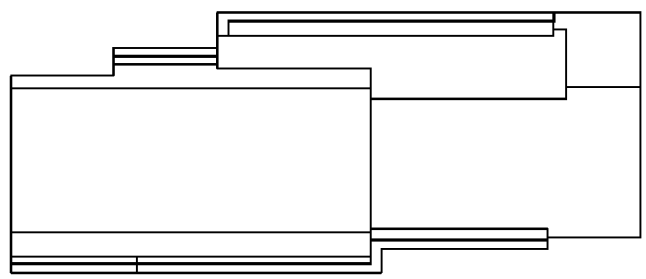
FIG. 27 is a front view showing the configuration of the joint cover according to the second embodiment.
Figure 28:
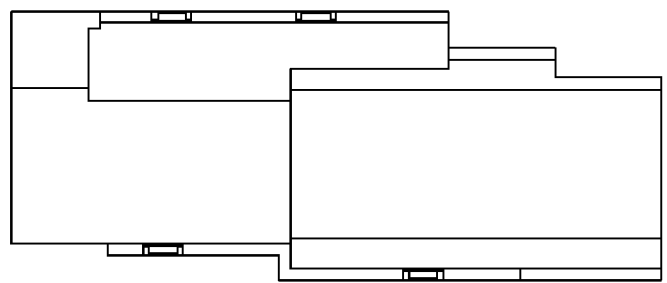
FIG. 28 is a rear view showing the configuration of the joint cover according to the second embodiment.
Figure 29:
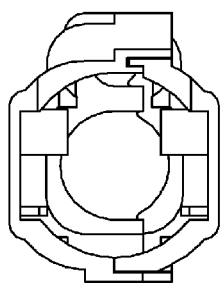
FIG. 29 is a left side view showing the configuration of the joint cover according to the second embodiment.
Figure 30:
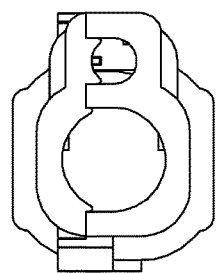
FIG. 30 is a right side view showing the configuration of the joint cover according to the second embodiment.
Figure 31:
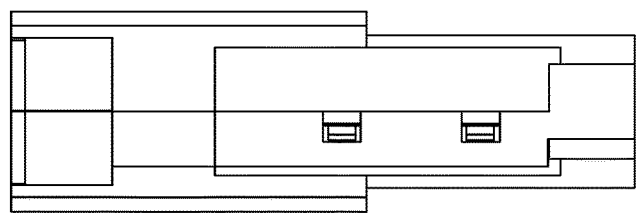
FIG. 31 is a plan view showing the configuration of the joint cover according to the second embodiment.
Figure 32:
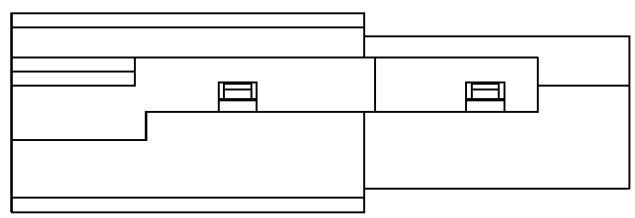
FIG. 32 is a bottom view showing the configuration of the joint cover according to the second embodiment.
Figure 33:
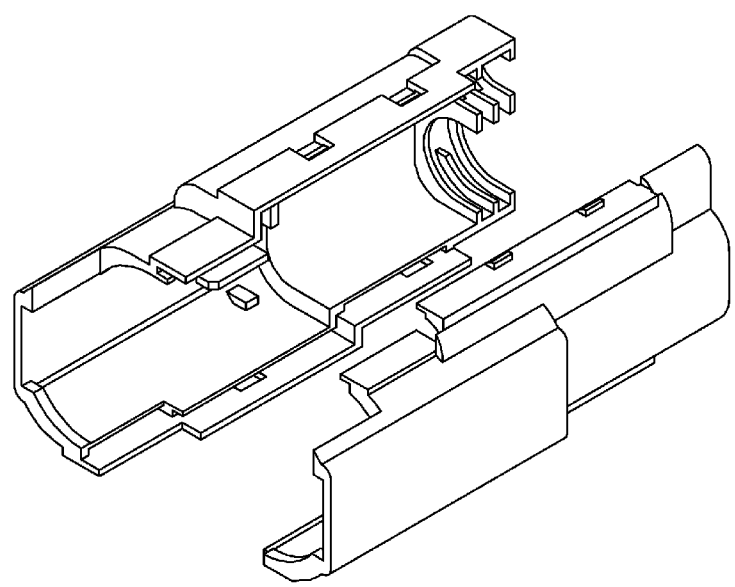
FIG. 33 is an exploded perspective view showing the configuration of the joint cover according to the second embodiment.
Figure 34:
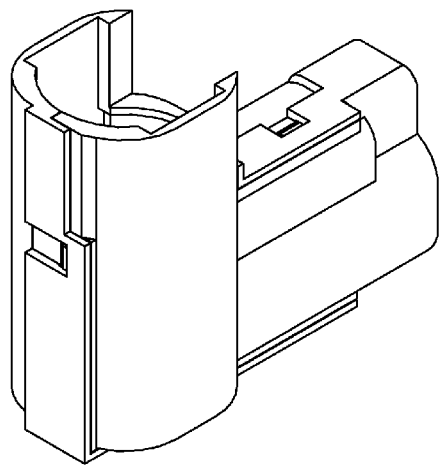
FIG. 34 is a perspective view showing the configuration of the joint cover according to the modification of the second embodiment.
Figure 35:
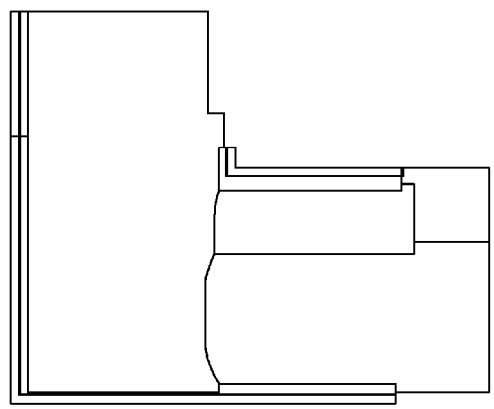
FIG. 35 is a front view showing the configuration of the joint cover according to the modification of the second embodiment.
Figure 36:
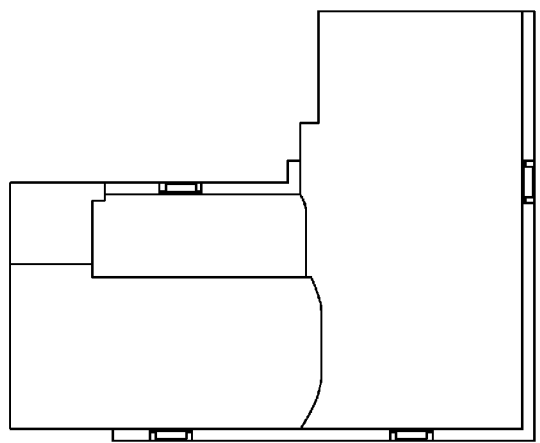
FIG. 36 is a rear view showing the configuration of the joint cover according to the modification of the second embodiment.
Figure 37:
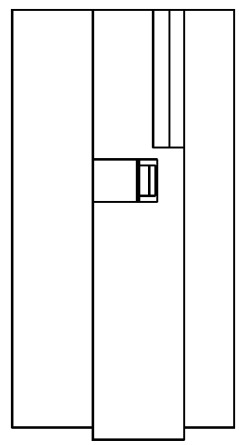
FIG. 37 is a left side view showing the configuration of the joint cover according to the modification of the second embodiment.
Figure 38:
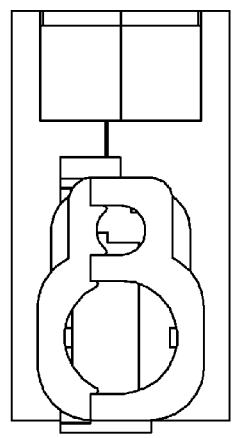
FIG. 38 is a right side view showing the configuration of the joint cover according to the modification of the second embodiment.
Figure 39:
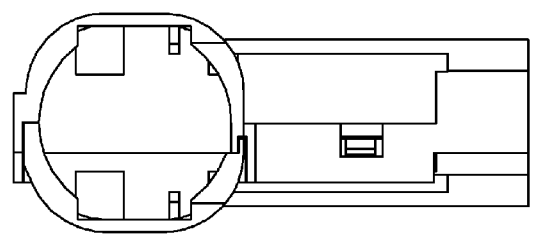
FIG. 39 is a plan view showing the configuration of the joint cover according to the modification of the second embodiment.
Figure 40:
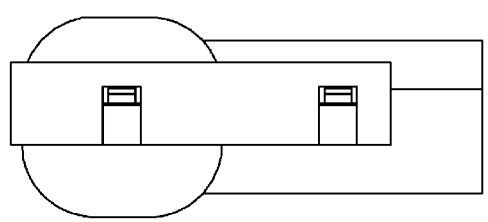
FIG. 40 is a bottom view showing the configuration of the joint cover according to the modification of the second embodiment.
Figure 41:
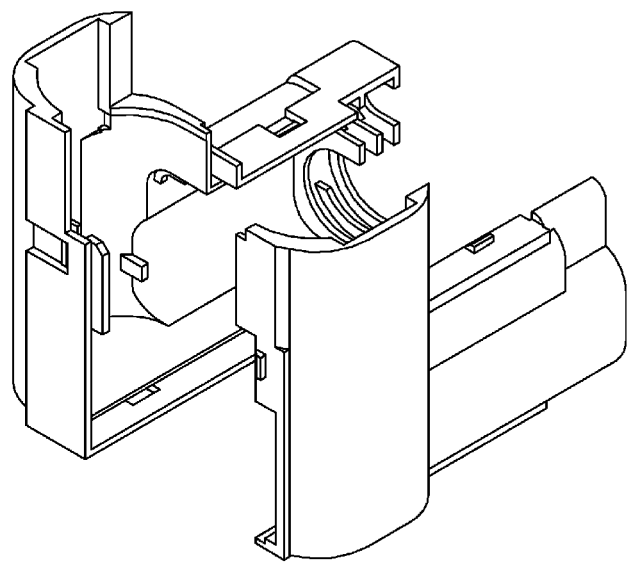
FIG. 41 is an exploded perspective view showing the configuration of the joint cover according to the modification of the second embodiment.

Whereas the joint cover 10C according to the second embodiment described above is used for the joint 16C in which the first terminal portion 50 and the second terminal portion 52 are provided coaxially, the present invention is not limited to this. For example, as shown in FIG. 9, the joint cover 10C may be a so-called elbow joint 16D in which a center axis of the first terminal portion 50 and a center axis of the second terminal portion 52 are at right angles to each other. In this case, to fit the shape of the joint 16D, a first cover body 56 and a second cover body 58 of the joint cover 10D are formed into an elbow shape. Detail views of the joint cover 10D according to the present modification are shown in FIG. 34 to FIG. 41.

3. Modifications

The present invention is not limited to the above embodiments, and may be changed as appropriate within the spirit and scope of the present invention.

REFERENCE SIGNS LIST 10A, 10B, 10C, 10D Joint cover
12 First cover body
14 Second cover body
16A, 16B, 16C, 16D Joint
20 Urea water supply pipe (tubular body)
22 Corrugated tube (protective tube)
23 Convex portion
24 First holding portion
28 Second holding portion
30 First terminal portion (terminal portion)
32 Second terminal portion (terminal portion)
41 Holding portion
D1 Dividing position

The invention claimed is:
1. A joint cover provided on the outside of a joint, the joint cover comprising:
   a first cover body provided with an opening and adapted to house one side of the joint;
   a second cover body detachably attachable to the first cover body to cover the opening of the first cover body; and
   a holding portion adapted to hold an outer circumference of a protective tube into which a tubular body to be connected to the joint is to be inserted, the holding portion being disposed at one end of the joint cover, the one end being defined as a front end of the joint cover, and having a first opening on the front end and an empty inner space thereinside such that the protective tube and tubular body extends through the first opening and are disposed in the inner space,
   wherein the first cover body and the second cover body are shaped to be asymmetrical to each other, the second cover body is configured to form less than half of an outer circumference of the joint cover, a dividing position formed when the first cover body and the second cover body are in contact with each other is offset toward the second cover body, the holding portion is composed with a first holding portion formed on the first cover body and a second holding portion formed on the second cover body, the first and second holding portions having concave shapes and forming the first opening, the first holding portion includes plural lamellar members that are arranged in parallel from the front end toward the inner space to mate with the protective tube, the second holding portion includes plural lamellar members that are arranged in parallel from the front end toward the inner space to mate with the protective tube, and is provided with convex portions formed on opposite ends, when the second cover body is fixed to the first cover body, the convex portions are disposed within the first holding portion so as to be placed in the first cover body side with respect to the dividing portion, and are to be in contact with the outer circumference of the protective tube, further the first cover body is provided with a first housing portion located adjacent to the first holding portion, the first housing portion having a concave shape, the second cover body is provided with a second housing portion located adjacent to the second holding portion, the second housing portion having a concave shape, and the first and second housing portions forming a second opening on the front end using their concave shapes, the second opening being designed for a wire and physically separated from the first opening, the second opening connects to the inner space such that the wire passing through the second opening reaches the inner space.

2. The joint cover according to claim 1, wherein in a portion of the joint cover covering a terminal portion formed in the joint, the dividing position is formed at a position corresponding to an approximate center of an outer circumference of the joint.

3. The joint cover according to claim 1, wherein an access window is formed at a position corresponding to a terminal portion of the joint.

4. The joint cover according to claim 1, wherein the joint cover is formed to be capable of exposing an outer circumference of a terminal portion of the joint.

5. The joint cover according to claim 1, wherein
the first opening is a substantially circular shape,
the first holding portion covers about ⅔ of an outer circumference of the first opening and the second holding portion covers the remaining of the first opening.

6. The joint cover according to claim 5, wherein
the second opening is a substantially circular shape,
the first housing portion covers about ⅔ of an outer circumference of the second opening and the second housing portion covers the remaining of the second opening.

7. The joint cover according to claim 6, wherein
seen from the plan view from the front end, the dividing position extends straight.

8. The joint cover according to claim 7, wherein
the second opening is smaller than the first opening, and seen from a plan view from the front end, centers of the first and second openings are arranged parallel to the dividing position.

* * * * *